Jan. 26, 1954  H. W. MULCAHY  2,667,277
FRICTION SHOCK ABSORBER FOR RAILWAY DRAFT RIGGINGS
Filed April 8, 1950  2 Sheets-Sheet 1
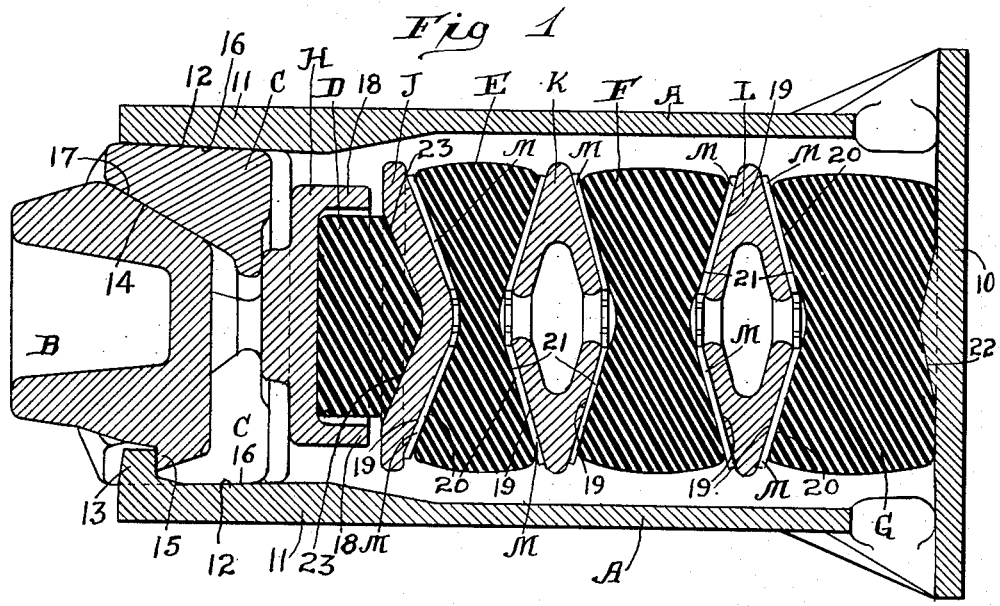
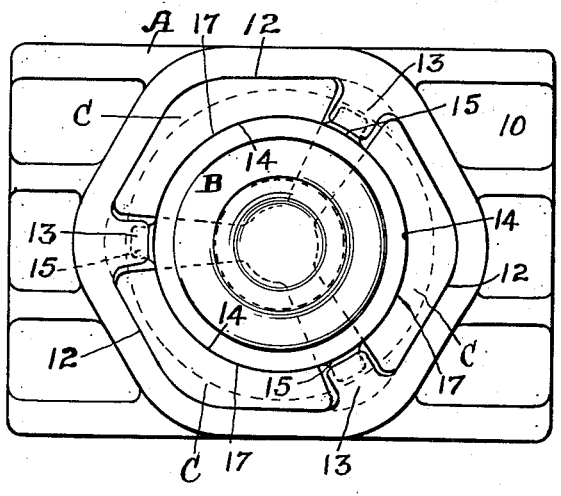
Inventor:
Harry W. Mulcahy.
By Henry Fuchs
Atty.

Jan. 26, 1954  H. W. MULCAHY  2,667,277
FRICTION SHOCK ABSORBER FOR RAILWAY DRAFT RIGGINGS
Filed April 8, 1950  2 Sheets-Sheet 2

Inventor:
Harry W. Mulcahy.
By Henry Fuchs
Atty.

Patented Jan. 26, 1954

2,667,277

UNITED STATES PATENT OFFICE 2,667,277

FRICTION SHOCK ABSORBER FOR RAILWAY DRAFT RIGGINGS

Harry W. Mulcahy, Chicago, Ill., assignor to W. H. Miner, Inc., Chicago, Ill., a corporation of Delaware Application April 8, 1950, Serial No. 154,793

6 Claims. (Cl. 213—32)

This invention relates to improvements in friction shock absorbing mechanisms of the character employed in the draft riggings of railway cars.

One object of the invention is to provide a friction shock absorbing mechanism comprising a friction casing, friction shoes slidingly telescoped within the casing, a wedge pressure transmitting member having wedging engagement with the shoes, yielding means within the casing opposing inward movement of the shoes comprising a plurality of rubber pads arranged in series, and metal spacing members alternated with the pads, wherein metal plates interposed between the spacing members and pads are employed, which plates have sliding frictional engagement with the spacing members to augment the frictional resistance of the mechanism.

Other objects of the invention will more clearly appear from the description and claims hereinafter following.

Figure 3:
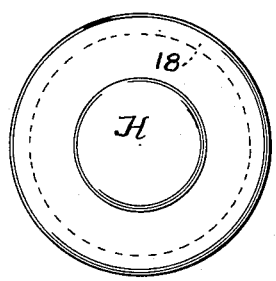
Figure 4:
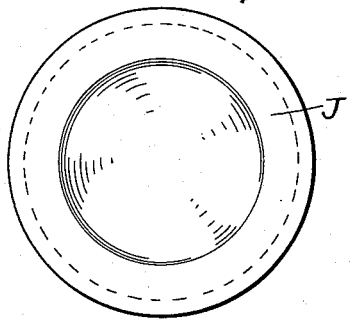
Figure 5:
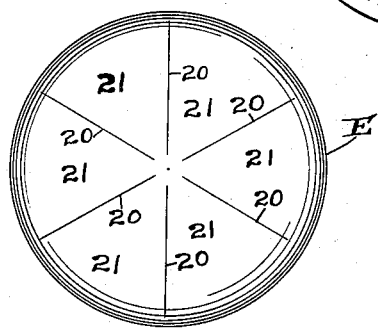
Figure 6:
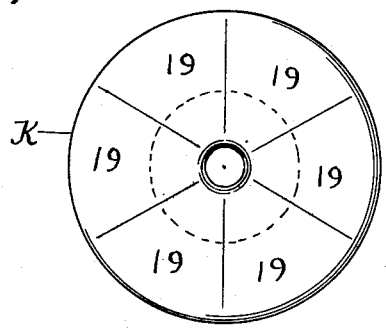
Figure 7:
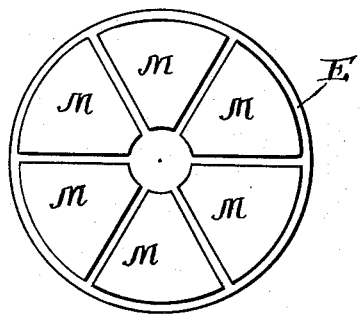

In the accompanying drawings forming a part of this specification, Figure 1 is a horizontal longitudinal sectional view of my improved friction shock absorbing mechanism. Figure 2 is an end elevational view of Figure 1, looking from left to right in said figure. Figure 3 is an elevational view of the follower member shown at the left hand end of Figure 1, looking from left to right in said figure. Figure 4 is an elevational view of the spacing member shown at the left hand end of Figure 1, looking from left to right in said figure. Figure 5 is an elevational view of the second rubber pad at the left hand end of the mechanism, shown in Figure 1, looking from left to right in said figure. Figure 6 is an elevational view of the second spacing member at the left hand end of the mechanism, looking from left to right in said figure. Figure 7 is an elevational view of the second rubber pad, considered from the left hand end of the mechanism, with the friction plates mounted thereon, said view being taken in a direction looking from left to right in said figure.

As shown in the drawings, my improved shock absorbing mechanism comprises broadly a friction casing A, a wedge block B, three friction shoes C—C—C, four rubber pads D, E, F, and G, a follower H, metal spacing members J, K, and L, and friction plates M cooperating with the spacing members.

The casing A is in the form of a hollow, tubular member, open at its front end and closed at its rear end by a transverse wall 10, which is extended laterally outwardly beyond the sides of the casing to provide a rear follower member which is integral with the casing and cooperates with the usual rear stop lugs of the center sills of a railway car. The casing A is of hexagonal transverse cross section and the walls thereof are inwardly thickened at its front or open end, thereby providing a friction shell section 11, presenting inwardly converging friction surfaces 12—12—12 of V-shaped, transverse cross section. Each friction surface 12 is formed by the interior faces of two adjacent walls of the hexagonal casing. At the open end, the casing A has three inturned stop lugs 13—13—13, which are alternated with the V-shaped friction surfaces of the casing, the same being at the corners between adjacent of said V-shaped surfaces.

The wedge B is in the form of a block having a set of three wedge faces 14—14—14 at its inner end, which are arranged symmetrically about the central longitudinal axis of the mechanism and converge inwardly thereof. Each wedge face 14 is of V-shaped, transverse cross section. At the inner end, the wedge B has three radial lugs 15—15—15, which are alternated with the wedge faces 14—14—14, extend between adjacent shoes, and engage in back of the lugs 13—13—13 of the casing to restrict outward movement of the block B and hold the mechanism assembled. The front end of the block B receives the actuating force, bearing on the usual front follower, not shown, of the draft rigging. The friction shoes are interposed between the faces 14 of the wedge block B and the friction surfaces 12 of the casing A. Each shoe C has longitudinally extending friction surface 16 of V-shaped, transverse cross section on its outer side engaged with one of the friction surfaces 12 of the casing, and a wedge face 17 on its inner side of V-shaped, transverse cross section, engaged with the corresponding wedge face 14 of the block B.

The rubber pads D, E, F, and G are arranged in series and form cushioning means within the casing A, which yieldingly opposes inward movement of the shoes C—C—C. The pad D, which is at the front or left hand end of the series, as seen in Figure 1, is seated in the follower H, which bears on the inner ends of the shoes C—C—C. The pads D, E, F, and G are all of substantially circular cross section, the pad D being of considerably smaller size than the pads E, F, and G.

The follower H, within which the pad D is seated, is in the form of a cup-shaped member, having a rearwardly or inwardly extending, cylindrical, peripheral flange 18, which overhangs the pad D. The pad D has a conical rear face 23 which bears on the spacing member J, which is recessed at its forward side to accommodate the projecting conical face 23 of the pad D.

The spacing members J, K, and L are alternated with the pads E, F, and G, the spacing member J being in the form of a heavy metal plate interposed between the pads D and E, and the spacing members K and L being in the forms of hollow blocks interposed, respectively, between the pads E and F, and F and G. The spacing member J presents, at the rear side thereof, a plurality of symmetrically arranged flat faces 19 which extend toward the center of the same and converge rearwardly of the mechanism. These faces are preferably six in number and, in effect, form friction wedge faces. The front and rear sides of the spacing members K and L are provided with flat faces, similar to the faces 19, and similarly arranged, which are also indicated by 19, the faces at the front sides of these members converging inwardly in direction forwardly of the mechanism, and the faces 19 at the rear sides thereof converging inwardly in direction rearwardly of the mechanism.

The friction plates M are fixed to the rubber pads E, F, and G, a set of six such plates being mounted on the front side of each pad E and F, a set of six on the rear side of each of said pads, and a set of six on the front side of the pad G. Each plate M is in the form of a flat, sector-shaped member, and the six plates of each set are arranged in annular series. The front and rear sides of the pads E, F, and G are recessed or depressed, as indicated at 20. These recessed portions of these pads present flat faces 21—21, which are correspondingly inclined to the adjacent faces 19—19 of the cooperating spacing members J, K, and L, the faces 21—21 being of sector-shape to correspond with the faces 19—19 of the plates M—M which are mounted thereon. The plates M are preferably fixed to the pads E, F, and G by being vulcanized to the faces 21 thereof. The plates M of the pads E, F, and G thus present friction wedge faces engaging the friction wedge faces of the spacing members J, K, and L. The rearmost of the series of rubber pads, that is, the pad G bears on the end wall 10 of the casing A and is recessed at its rear side to accommodate a conical centering projection 22 with which said wall 10 is provided.

The operation of my improved shock absorber is as follows: As the wedge B is forced inwardly during compression of the mechanism, the shoes C—C—C are spread apart into tight frictional engagement with the friction surfaces 12—12—12 of the casing and forced to slide rearwardly on said friction surfaces against the resistance of the cushioning element, which includes the rubber pads D, E, F, and G, compressing these pads. As the pads are being compressed, the spacing members are wedged against the plates M, causing the pads to be spread radially and thereby effecting relative sliding movement of the plates M on the friction wedge faces 19 of the spacing members, thereby providing frictional resistance to absorb the shocks, which resistance is in addition to the frictional resistance provided by the shoes C—C—C in their sliding movements inwardly of the casing. In release of the mechanism, when the actuating force on the wedge B is reduced, the inherent resiliency of the rubber pads restores the mechanism to the fully expanded release position illustrated in Figure 1.

I claim:

1. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including a series of rubber pads, rigid spacing members alternated with said pads, and friction plates interposed between said spacing members and pads, said spacing members having friction surfaces inclined to the longitudinal axis of the mechanism, said plates being fixed to the pads and having sliding engagement with the friction surfaces of said spacing members.

2. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including rubber pads arranged in series, rigid spacing members alternated with said pads, and inclined friction plates between said pads and spacing members, said pads having supporting surfaces inclined to the longitudinal axis of the mechanism, and said spacing members having friction surfaces inclined to said longitudinal axis, said plates being vulcanized to the supporting surfaces of said pads, and said plates being engaged with the friction surfaces of said spacing members.

3. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including rubber pads arranged in series lengthwise of the mechanism, rigid spacing members alternated with said pads, said spacing members having laterally diverging, transverse friction faces thereon at opposite sides of the longitudinal central axis of the mechanism and diverging laterally outwardly, and transversely arranged friction plates at opposite sides of the longitudinal central axis of the mechanism, slidable on said faces, said plates being fixedly secured to the adjacent rubber pads.

4. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including rubber pads arranged in series lengthwise of the mechanism, and rigid spacing members alternated with said pads, adjacent sides of said spacing members and rubber pads being provided with similarly inclined faces, extending radially outwardly away from the longitudinal central axis of the mechanism, the inclined faces of said pads having friction plates fixed thereto which are in sliding contact with the inclined faces of said spacing members.

5. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including a rigid transverse member and a transversely arranged rubber pad adjacent said member, said pad having the side thereof adjacent said member provided with an annular series of radially arranged friction plates inclined with respect to the longitudinal central axis of the mechanism, and said transverse member having an annular series of radially extending friction surfaces on the side thereof facing said pad, correspondingly inclined to said friction plates, respectively, and in sliding engagement with the same.

6. In a friction shock absorbing mechanism, the combination with a friction casing; of friction shoes slidingly telescoped within the casing; a pressure transmitting block in wedging engagement with the shoes; and yielding means within the casing opposing inward movement of said shoes, said yielding means including a transversely arranged rigid member and a transversely arranged rubber pad adjacent said member, said pad having the side thereof adjacent said member provided with a plurality of sector-shaped, radially extending plates arranged in annular series and inclined with respect to the longitudinal central axis of the mechanism, and said transverse member having an annular series of radially extending friction surfaces on the side thereof facing said pad, correspondingly inclined to said plates, respectively, and in sliding engagement with the same.

HARRY W. MULCAHY.

References Cited in the file of this patent

UNITED STATES PATENTS

| Number | Name | Date |
| --- | --- | --- |
| 377,125 | Trent | Jan. 31, 1888 |
| 2,002,377 | Mayne | May 21, 1935 |
| 2,260,532 | Lindeman | Oct. 28, 1941 |
| 2,463,373 | Gadbois | Mar. 1, 1949 |
| 2,552,667 | Dath | May 15, 1951 |